Figure 1:
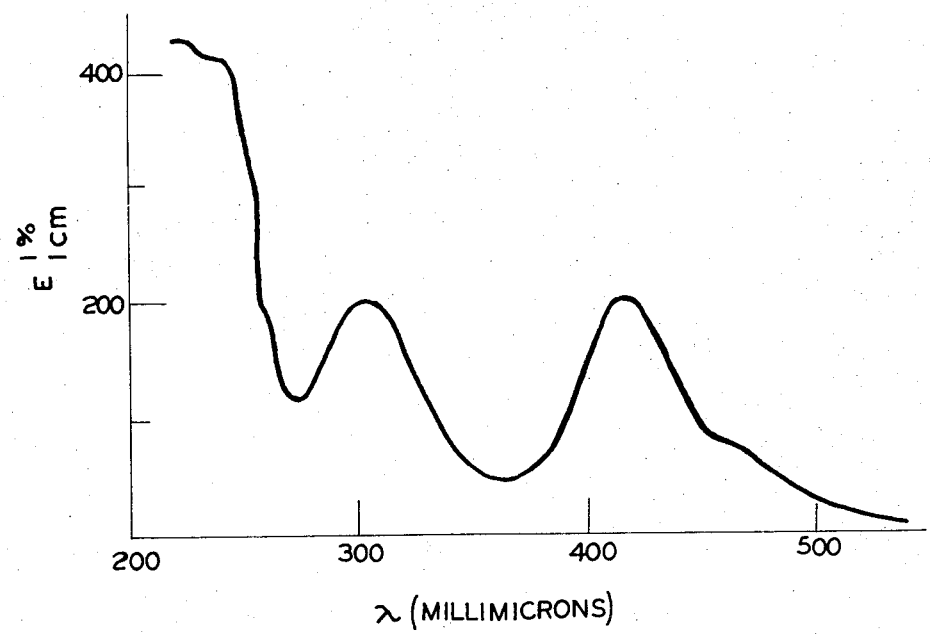

United States Patent [19]
Kishi et al.

[11] 3,717,707
[45] Feb. 20, 1973

[54] ANTIBIOTIC B-2847RB AND PRODUCTION THEREOF

[75] Inventors: Toyokazu Kishi, Nara; Mitsuko Asai, Takatsuki; Setsuo Harada; Masayuki Muroi, both of Suita; Komei Mizuno, Settsu, all of Japan

[73] Assignee: Takeda Chemical Industries, Ltd., Higashi-ku, Osaka, Japan

[22] Filed: March 31, 1970

[21] Appl. No.: 24,130

[30] Foreign Application Priority Data

March 31, 1969 Japan .................................44/24672

[52] U.S. Cl. ...................424/122, 424/123, 424/124
[51] Int. Cl. ..............................................A61k 21/00
[58] Field of Search...............................424/122–124

[56] References Cited

UNITED STATES PATENTS

| | | | |
|---|---|---|---|
| 3,014,841 | 12/1961 | Smith et al. | 424/124 |
| 3,311,538 | 3/1967 | Ball | 424/122 |

*Primary Examiner*—Albert T. Meyers
*Assistant Examiner*—Daren M. Stephens
*Attorney*—Wenderoth, Lind & Ponack

[57] ABSTRACT

A novel antibiotic B-2847RB, which is obtained by reducing antibiotic B-2847Y and/or antibiotic B-2847R, shows strong antimicrobial activities against Gram-positive bacteria and is characterized by a lessened toxicity against mammals and an increased stability in an aqueous solution in comparison with the antibiotics B-2847Y and B-2847R.

2 Claims, 2 Drawing Figures

ANTIBIOTIC B-2847RB AND PRODUCTION THEREOF

This invention relates to antimicrobially active novel compound and to production thereof. More particularly, this invention relates to antibiotic B-2847RB and production thereof.

The present inventors have found that when antibiotics B-2847Y and B-2847R, both being discovered by the present inventors together with some other researchers (See Dutch Patent application No. 68,02679 laid open into public inspection on Aug. 26, 1968), are subjected to reduction with a specific reducing agent, a novel antibiotic showing a lessened toxicity and an increased stability is obtained. This novel antibiotic has been named "B-2847RB" in contrast to the known antibiotics "B-2847Y" and "B-2847R".

The starting materials of the present invention, B-2847Y and B-2847R have also been disclosed in U.S. application Ser. No. 708,319 filed Feb. 26, 1968, now U.S. Pat. No. 3,627,881, issued Dec. 14, 1971, which Patent is commonly owned by the Assignees of the present invention. Further, the context of the U.S. application Ser. No. 708,319 is essentially the same as the Dutch application No. 6,802,679 mentioned above and describes in detail how to prepare the B-2847Y and B-2947R materials.

The principal object of the present invention is to provide a novel antibiotic B-2847RB with excellent properties. Another object of the present invention is to provide an industrially feasible method for producing the said antibiotic B-2847RB.

Antibiotics B-2847Y and B-2847R to be employed as the starting materials in the method of the present invention may be prepared by, for example, cultivating *Streptomyces tolypophorus* ATCC-21177 as disclosed in the said Dutch Patent application No. 68,02679.

In the method of the present invention, antibiotic B-2847Y, antibiotic B-2874R or a mixture thereof is subjected to reduction to yield antibiotic B-2847RB. As the reducing agent, there may be advantageously employed a borohydride e.g. sodium borohydride, or a dithionite e.g. sodium dithionite. This reduction reaction smoothly proceeds at a room temperature (about 5° to 30° C). As the solvent, there may preferably be employed one or more organic solvents, in which the starting materials can be dissolved, or a mixture of water and such an organic solvent.

Antibiotic B-2847RB thus produced may be recovered from the reaction mixture and refined to a desired purity by utilizing the physico-chemical properties of antibiotic B-2847RB, for example, differences between antibiotic B-2847RB and impurities in solubility, in partition coefficient between two liquid phases or in adsorbability.

The physico-chemical properties of antibiotic B-2847RB thus obtained are as follows:

1. Elementary analysis

| C | H | N |
|---|---|---|
| 61.42±1.0% | 6.85±0.5% | 3.31-10.5% |

2. Specific Rotation $[\alpha]_D^{22} = +133.4° \pm 13°(C=1.0, EtOH)$ $= +257° \pm 26°(C=1.0, CHCl_3)$ 3. Color Reaction It is positive to ferric chloride-potassium ferricyanide reagent (1:1 by weight)

4. Molecular Weight

About 830 when measured by the Vapor Pressure method using ethyl acetate as a solvent.

5. Solubility

Soluble in methanol, ethanol, n-butanol, acetone, chloroform, ethyl acetate, diethyl ether; hardly soluble in water, and insoluble in n-hexane.

6. Absorption Spectrum

The ultraviolet and visible absorption spectrum in ethanol is as shown in FIG. 1 of the accompanying drawing.

The significant maximum absorptions observed are as follows:

$\lambda_{max.}^{EtOH}$ 224±2m$\mu$ ($E_{1cm}^{1\%} = 446\pm45$)

240±2m$\mu$ ($E_{1cm}^{1\%} = 426\pm40$)

301±2m$\mu$ ($E_{1cm}^{1\%} = 197\pm20$)

420±2m$\mu$ ($E_{1cm}^{1\%} = 203\pm20$)

Figure 2:
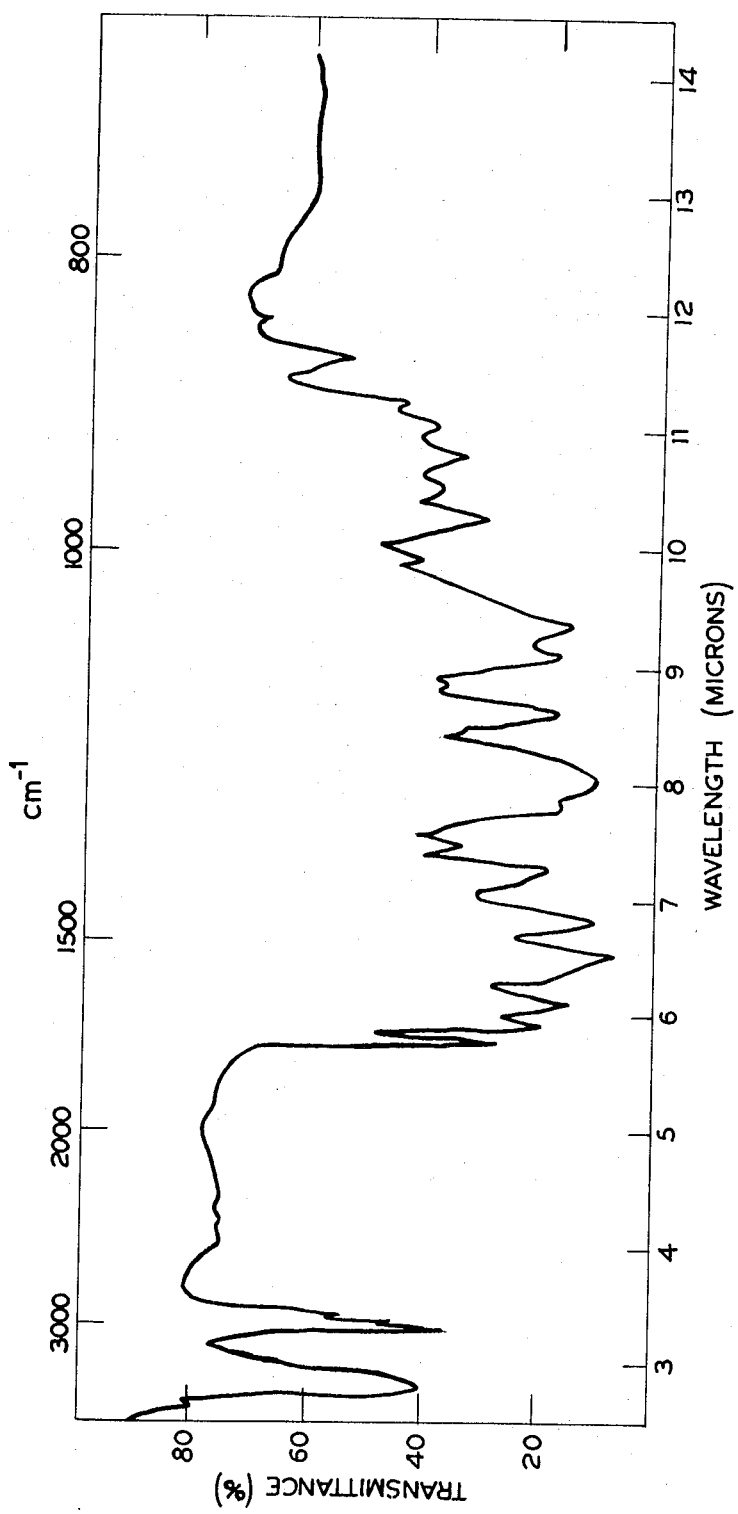

Infrared absorption spectrum in chloroform is as shown in FIG. 2 of the accompanying drawing, and the significant absorptions in wave number are as follows: 3490(M), 3000(M), 1715(M), 1670(S), 1625(S), 1565(S*h*), 1530(VS), 1465(VS), 1385(S), 1370(S), 1325(S), 1280(S), 1240(VS), 1160(S), 1095(S), 1065(S), 1020(S*h*), 1003(M), 973(S), 945(M), 920(M), 898(M), 885(S*h*)cm$^1$.

Notes: VS; very strong, S; strong, M; medium, S*h*; shoulder.

The biological properties of the antibiotic B-2847RB are as follows:

1. Antimicrobial spectrum

Antimicrobial activities of B-2847RB against various microorganisms are shown in Table 1.

The tests are carried out at 37° C on bouillon agar for 20 hours against ordinary bacteria, at 37° C on glycerin bouillon agar for 48 hours against acid-fast bacteria.

TABLE 1

| Microorganisms | Minimum Inhibitory Concentration (microgram/milliliter) |
|---|---|
| Escherichia coli | 50 – 100 |
| Proteus vulgaris | 50 |
| Staphylococcus aureus 209p | 0.01 – 0.005 |
| Staphylococcus aureus Terajima | 0.01 – 0.005 |
| Staphylococcus aureus Heatley | 0.005 |
| Bacillus subtilis | 1.0 |
| Bacillus cereus | 1.0 |
| Bacillus brevis | 0.05 |
| Mycobacterium avium | >100 |
| Mycobacterium avium (streptomycin resistant) | >100 |
| Mycobacterium smegmatis | 20 – 50 |
| Mycobacterium phlei | 100 |
| Mycobacterium sp. ATCC 607 | >100 |

As clearly seen in Table 1, antibiotic B-2847RB shows strong antibacterial activities against Gram-positive bacteria.

2. Acute toxicity

Fifty percent Lethal doses ($LD_{50}$) of the antibiotic B-2847RB in mice are as follows;

>1000 mg/kg. (intraperitoneally, when observed for 7 days).

about 500–750mg/kg. (intraveneously, when observed for 7 days).

The novel Antibiotic B-2847RB has clearly different properties from those of Antibiotics B-2847Y and R, among others, in ultraviolet spectra, infrared spectra and specific rotation.

Therapeutic tests involving the oral administration of test antibiotics to infected animals have revealed that B-2847RB is substantially as effective as B-2847Y and B-2847R.

Furthermore, antibiotic B-2847RB is characterized by a lessened toxicity against mammals and an increased stability in an aqueous solution in comparison with B-2847Y and B-2847R.

Staphylococci which are pyogenic or pus-forming tend to produce circumscribed lesions, e.g. in the form of abscesses and the like, which often occur in the skin. Those Staphylococci are the cause of furuncles and of carbuncles and other common wound infections. Antibiotic B-2847RB of the present invention is useful in pharmaceutical preparations for the topical treatment of this type of infection in mammals (dogs, cats, humans, etc.). Thus, a useful preparation for topical application to an infection due to *Staphylococcus aureus* is as follows:

Into 1 gram of wool fat is uniformly incorporated 10 to 20 milligrams of antibiotic B-2847RB and the mixture is then admixed uniformly with sufficient white petrolatum to make 10 grams of an ointment.

This ointment is to be applied topically in an amount sufficient to cover the wound or region to be treated, with gently rubbing in, at least once daily or, depending on cases, several times daily.

Due to the above-mentioned bacteriocidal activity of antibiotic B-2847RB, it is useful e.g. to disinfect hospital apparatus, etc. which are generally exposed to pathogenic Gram-positive bacteria of the type which are sensitive to this product, as aforementioned. Disinfection is effected by application or spraying of a solution (e.g. methanolic or ethanolic, etc.) containing about 20 to 200 micrograms of antibiotic B-2847RB.

The following examples are merely for illustrative purposes and are not to be construed as limitation of the present invention. In these examples, the abbreviations mg., g., ml. refer respectively to milligram(s), gram(s) milliliter(s) and parts by weight bear the same relation to parts by volume as do grams to milliliters.

EXAMPLE 1

To a solution of 5.0g. of antibiotic B-2847Y in 1000 ml. of ethyl acetate is added 400 ml. of water. While the mixture is stirred at room temperature, 2.5 g. of sodium borohydride is added thereto little by little. After stirring for 25 minutes the reaction mixture is neutralized with 2N-hydrochloric acid. Then the ethyl acetate layer is recovered and washed with water. After dehydration, the ethyl acetate layer is concentrated under reduced pressure. The resulting residue is dissolved in 30 ml. of acetone. The solution is admixed with 150 ml. of n-hexane to give precipitates. The precipitates are recovered by filtration to yield 3.0g. of crude powder.

A solution of 1.0g. of the crude powder in 10 ml. of ethyl acetate is allowed to pass through a column packed with 20g. of silica gel and the column was subjected to elution with 400 ml. of a mixture of ethyl acetate and acetone (4:1 by volume). The eluate is concentrated to dryness and the residue is dissolved in 5 ml. of benzene. To the resulting solution is added 50 ml. of n-hexane to give 0.8g. of yellow powder of antibiotic B-2847RB.

0.6g. of the powder is subjected to thin layer chromatography on silica gel employing a mixture of ethyl acetate and acetone (1:1 by volume) as the developer. The yellow zone at $Rf$ about 0.65 is extracted with 100 ml. of ethyl acetate. The extract is concentrated, followed by the addition of n-hexane to give 0.4g. of antibiotic B-2847RB as yellow powder.

EXAMPLE 2

To a solution of 300 mg. of antibiotic B-2847Y in 30 ml. of acetone is added at a room temperature little by little 10 ml. of a 10 percent aqueous solution of sodium dithionite ($Na_2S_2O_4 \cdot 2H_2O$) and the mixture is kept standing with stirring for 15 minutes. The reaction mixture is subjected to extraction with 30 ml. of benzene. The benzene layer is washed with water and is concentrated under reduced pressure.

The resulting residue is subjected to thin layer chromatography on silica gel containing 2 percent of oxalic acid employing a mixture of 1 percent oxalic acid-containing ethyl acetate and acetone (1:1 by volume) as the developer. The yellow zone at $Rf$ about 0.5 is extracted with 100 ml. of ethyl acetate. The extract is concentrated to about 1 ml. To the concentrate is added 20 ml. of n-hexane to give 30 mg. of antibiotic B-2847RB as yellow powder.

EXAMPLE 3

To a solution of 500 parts by weight of antibiotic B-2847R in 100,000 parts by weight of ethyl acetate is added 40,000 parts by volume of water. With the mixture being stirred at a room temperature, 250 parts by weight of sodium borohydride is added thereto little by little. After stirring for 20 minutes, the ethyl acetate layer is recovered and neutralized with 2N-hydrochoric acid and subsequently washed with water. After dehydration, the ethyl acetate layer is concentrated under reduced pressure. The resulting residue is dissolved in 2000 parts by volume of benzene. The solution is admixed with 20,000 parts by volume of n-hexane to give 340 parts by weight of anti-biotic B-2847RB.

What is claimed is:

1. Antibiotic B-2847RB, having the following characteristics:
    1. Elementary analysis is C 61.42±1.0%, H 6.85±0.5%, N 3.31±0.5%;
    2. Specific rotation is $[\alpha]_D^{22}$ = +133.4°±13°(C =1.0,EtOH) =+257°±26°(C=1.0, $CHCl_3$)
    3. Color reaction is positive to ferric chloride-potassium ferricyanide reagent (1:1 by weight);
    4. Molecular weight is about 830 by the Vapor Pressure method;
    5. Soluble in methanol, ethanol, n-butanol, acetone, chloroform, ethyl acetate, diethyl ether, benzene; hardly soluble in water; and insoluble in n-hexane;

6. Ultraviolet and visible absorption spectrum in EtOH is as shown in FIG. 1 of the accompanying drawing, and the significant maximum absorptions observed are as follows:

$\lambda_{max.}^{EtOH}$ 224±2m$\mu$ (E$_{lcm}^{1\%}$ = 446±45)

240±2m$\mu$ (E$_{lcm}^{1\%}$ = 426±40)

301±2m$\mu$ (E$_{lcm}^{1\%}$ = 197±20)

420±2m$\mu$ (E$_{lcm}^{1\%}$ = 203±20)

7. Infrared absorption spectrum is as shown in FIG. 2 of the accompanying drawing, with the following significant absorption in wave number:
3490(M), 3000(M), 1715(M), 1670(S), 1625(S), 1565(S$h$), 1530(VS), 1465(VS), 1385(S), 1370(S), 1325(S), 1280(S), 1240(VS), 1160(S), 1095(S), 1065(S), 1020(S$h$), 1003(M), 973(S), 945(M), 920(M), 898(M), 885(S$h$)cm$^1$ (in CHCl$_3$); and 8. Shows antimicrobial activities against Gram-positive bacteria.

2. A method for producing antibiotic B-2847RB as defined in claim 1, which comprises reducing antibiotic B-2847Y, antibiotic B-2847R or mixtures thereof with a reducing agent selected from the group consisting of sodium borohydride and sodium dithionite at a temperature between about 5° to 30° C in the presence of one or more organic solvents or a mixture of water and an organic solvent and recovering the B-2847RB from the reaction mixture.

* * * * *